United States Patent [19]

Rapp

[11] 4,076,541
[45] Feb. 28, 1978

[54] GLASSES SUITABLE FOR LASER APPLICATION, GLASS LASERS, AND METHOD FOR MAKING SAME

[75] Inventor: Charles F. Rapp, Toledo, Ohio
[73] Assignee: Owens-Illinois, Inc., Toledo, Ohio
[21] Appl. No.: 669,067
[22] Filed: Mar. 22, 1976
[51] Int. Cl.$^2$ .......................... C03C 3/16; C03C 3/28; C03C 3/30
[52] U.S. Cl. .................................. 106/47 Q; 65/32; 65/134; 252/301.4 P; 331/94.5 E; 331/94.5 T
[58] Field of Search .................... 106/47 Q, 47 R; 252/301.4 P; 331/94.5 E; 65/32, 134

[56] References Cited

U.S. PATENT DOCUMENTS

| | | | |
|---|---|---|---|
| 2,920,972 | 1/1960 | Godron | 106/47 R |
| 3,253,934 | 5/1966 | Godron | 106/47 R |
| 3,531,271 | 9/1970 | Dumbaugh | 65/32 |
| 3,531,305 | 9/1970 | Dumbaugh | 65/134 X |
| 3,711,787 | 1/1973 | Snitzer et al. | 331/94.5 E |
| 3,716,349 | 2/1973 | Deeg et al. | 65/32 |
| 3,731,226 | 5/1973 | Snitzer et al. | 331/94.5 E |
| 3,813,613 | 5/1974 | Danielmeyer et al. | 252/301.4 P |
| 3,830,749 | 8/1974 | Deeg et al. | 65/32 |
| 3,846,142 | 11/1974 | Buzhinsky et al. | 252/301.4 P |
| 3,863,177 | 1/1975 | Damen et al. | 252/301.4 P |
| 3,868,170 | 2/1975 | DeLuca | 65/32 |
| 3,935,018 | 1/1976 | Ray et al. | 106/47 Q |

FOREIGN PATENT DOCUMENTS

| | | | |
|---|---|---|---|
| 1,599,962 | 7/1970 | France | 252/301.4 P |
| 1,396,452 | 6/1975 | United Kingdom. | |
| 326,136 | 2/1972 | U.S.S.R. | 65/134 |

OTHER PUBLICATIONS

Grove; F. J.–"Water in Glass" Chem. Abstracts, vol. 53, 3627.
Bondarenko; E. G. et al.–"The Effect of Water in Glass on the Quenching of the Luminescence of the Rare--Earth Activator" Sov. J. Techn., 42, No. 6, Jun. 1975, pp. 333–335.
Chemical Week–"Liquid Laser Soup", 106 (24) Jun. 17, 1970, p. 149.
Sproull; J. F. et al., "Effect of Melting History on Mechanical Properties of Glass: II, Effects of Raw Materials and Bubbling Gases through the Melt" J. Am. Cer. Soc. 58, (1,2) (Jan. 1975), pp. 35–37.

Primary Examiner—Helen M. McCarthy
Attorney, Agent, or Firm—Charles S. Lynch; E. J. Holler

[57] ABSTRACT

Disclosed are phosphate glasses containing BaO, $K_2O$, $Al_2O_3$ and $Nd_2O_3$ and containing only very low amounts of water and a method of making such glasses.

11 Claims, No Drawings

GLASSES SUITABLE FOR LASER APPLICATION, GLASS LASERS, AND METHOD FOR MAKING SAME

The present invention relates to novel glass compositions having certain valuable properties and, more particularly, to glass compositions which are useful for glass laser components, and methods of making same.

The term "laser" is an acronym for "light amplification by stimulated emission of radiation." A laser is a device capable of amplifying or generating coherent light. For example, lasers can be used to generate monochromatic optical radiation in the form of a plane wave with a beam angle divergence theoretically limited by diffraction effects. When a material exhibits stimulated emission of radiation under a particular set of conditions it is said to "lase."

The configuration of the laser body itself may take various forms. For example, it may be in the form of a small cylinder or rod the end faces of which are plane and which may have an extremely high degree of parallel accuracy. The glass laser component may also be in the form of a disc or a slab configuration, etc. Furthermore, the laser body can be used either as an oscillator or as an amplifier; see for instance the book "Glass Lasers" by K. Patek, CRC Press, Cleveland, 1970, especially Chapters 12 and 13. In any event, it will be apparent that the configuration and characteristics of the laser body may vary widely and are not critical features of the present invention. In actual operation, the laser body can be irradiated by suitable means such as a flash lamp operating for a few milliseconds or less. However, other excitation sources such as another laser can be used. Also, in some applications continuous excitation, rather than pulsed excitation, is employed. Further information concerning lasers will be found in the book entitled, "Introduction to Laser Physics," by Bela A. Lengyel, John Wiley & Sons, New York, 1966.

British patent specification No. 1,396,452 discloses a broad range of phosphate laser glasses containing

| | Mole percent |
|---|---|
| $P_2O_5$ | 35–49 |
| $Li_2O + Na_2O + K_2O$ | 1–30 |
| $MgO + CaO + SrO + BaO + ZnO + CdO$ | 20–45 |
| Nd, Yb, Er, Ho & Tm oxides | 0.1–25 |
| B, Al, Nb & Pb oxides | 0–27 |

A single glass (Example I) within the foregoing very broad range of glasses, having the components of the glasses of my invention to be described hereafter, has the composition:

| | Mole Percent |
|---|---|
| $P_2O_5$ | 49.0 |
| BaO | 25.0 |
| $K_2O$ | 19.0 |
| $Al_2O_3$ | 5.0 |
| $Nd_2O_3$ | 2.0 |

Further, in column 2 of this patent reference is made to the laboratory work of Deutschbein. The glass indicated by Deutschbein to be his best candidate glass from the standpoint of laser properties is highly unstable and easily spontaneously devitrifies on casting and is an impracticable composition for making glass laser components of any appreciable size. This composition was made and is Example 3 shown in Table I herein.

As will become apparent from the disclosures hereafter, the glasses of British Pat. No. 1,396,452 do not reflect a recognition of the importance of limiting the amount of BaO to produce a glass having a relatively low index of refraction, $n_D$, and consequently a relatively low non-linear index of refraction, $n_2$. Moreover, the British patent, as well as Deutschbein, does not recognize (1) the presence of significant water (or hydroxyl ions) in phosphate glasses with high amounts of $P_2O_5$, (2) the effect of such water on the lasing properties of $Nd_2O_3$ activated glasses or (3) any method of overcoming this unrecognized problem.

It is an object of the present invention to provide a method for making relatively dry phosphate based glasses containing $Nd_2O_3$ and laser glass components made therefrom.

It is a further object to provide new and improved glasses suitable for lasers, and new laser glass components, in the $P_2O_5$—BaO—$K_2O$—$Al_2O_3$—$Nd_2O_3$ field which are relatively dry and thus have long fluorescent decay times.

Other objects, as well as aspects and advantages, of the invention will become apparent from the accompanying discussion and disclosure.

I have discovered that residual water in phosphorus-containing laser glasses strongly quenches the fluorescence of the $Nd^{3+}$ ion.

I have further discovered, surprisingly, that glass melts having high percentages of $P_2O_5$, as in the present glasses, contain surprisingly high amounts of water, relatively speaking, even when melted for long periods at high temperature in air and that the glass melt apparently comes to an "equilibrium" with the water in the ambient air normally entering the furnace, thus producing a laser glass having enough water to quench the lasing action to a wholly undesirable degree.

Based on these discoveries I have found that a much improved phosphate laser glass containing $Nd_2O_3$ as the active species results when the atmosphere in contact with the molten glass during at least the final stages of melting is a dry oxygen-containing gas, such as dry air or oxygen. During at least part of the melting the dry gas can be bubbled through the melt to speed the process of drying if desired. In any event the process of my invention contemplates the heating of the molten glass during the final stages of such melting until the resulting glass formed on cooling has a transparency with respect to light of a wavelength of 2.1 microns of at least 0.65, preferably at least 0.80, per centimeter thickness. Such a glass laser has a longer fluorescence decay time than a similar glass containing larger amounts of water, as indicated by its lower transparency to light of a wavelength of 2.1 microns. My process is applicable broadly to glasses having at least 39 mole percent $P_2O_5$ and having $Nd_2O_3$ as the active lasing species and is, of course, more specifically applicable to the new glass compositions of my invention.

I have also discovered new phosphate glasses and glass laser components having the hereinbefore defined transparencies to light of the wavelength of 2.1 microns and having the following composition:

| Ingredient | Mole Percent |
|---|---|
| $P_2O_5$ | 39–65 |

-continued

| Ingredient | Mole Percent |
|---|---|
| $Al_2O_3$ | 4–13 |
| $K_2O$ | 19–36 |
| $BaO$ | 3–18.5 |
| $La_2O_3$ | 0–3 |
| $P_2O_5 + Al_2O_3 + La_2O_3 + Nd_2O_3$ | $\geq 50$ | plus an effective amount (a laseable amount) up to 6 mole percent $Nd_2O_3$. Usually the glasses and glass laser components of the invention contain from 0.05 to 4 mole percent $Nd_2O_3$ and a total of from 0.05 to 4 mole percent $La_2O_3$ plus $Nd_2O_3$. In most instances the laser glass will have at least 0.1 mole percent $Nd_2O_3$. Compositions containing less than 39 mole percent $P_2O_5$ tend to be unstable and thus easily devitrify, while those having more than 65 mole percent $P_2O_5$ or less than 50 mole percent $P_2O_5+Al_2O_3+La_2O_3+Nd_2O_3$ tend to be excessively attacked and corroded by the action of water when in contact with moisture, even atmospheric moisture.

The upper limits of $La_2O_3$ and of $BaO$ are especially important in limiting the index of refraction $n_D$.

Thus, it has been found that as the index of refraction, $n_D$, is lowered the non-linear index of refraction, $n_2$, is also lowered, the importance of which is discussed hereafter. For this reason, since $BaO$ greatly increases the index of refraction, it is usually preferred to limit the $BaO$ to 17 mole percent. And, while $La_2O_3$ tends to decrease the tendency of the glasses to chemical attack by moisture and to increase the stability towards devitrification, this oxide also strongly increases the index of refraction, $n_D$, and its content in the glass thus advantageously can be limited to substantially zero.

The aluminum oxide is an important, necessary component of the glasses because of its role in making a practicable glass, reducing the tendency of the glass to spontaneously crystallize and increasing its resistance to attack by water in the air. The upper limit on the $K_2O$ is necessitated by the tendency of this component to decrease resistance to attack by moisture.

The importance of the non-linear index of refraction, $n_2$, is that the lower it is, the less tendency the glass has to self-focus. This index is lower when the linear index of refraction, $n_D$, is lower. The non-linear index of refraction, $n_2$, is found by the formula, where $v_D$ is the Abbe number:

$$n_2 \times 10^{13} = \frac{68(n_D-1)(n_D^2+2)^2}{v_D[1.5+(n_D^2+2)(n_D+1)v_D/6n_D]^{\frac{1}{2}}} \text{ cm.}^2/(\text{statvolts})^2$$

The formula is accurate to about ± 10 percent.

It will be seen that a combination of a high Abbe number and a low index of refraction, $n_D$, results in a low non-linear index of refraction, $n_2$. A laser glass component with a relatively high $n_2$ tends to self-focus, especially when used in very high peak power neodymium glass lasers. Self-focusing causes permanent damage to a neodymium glass laser component. It is thus extremely important that neodymium laser glasses and glass laser components have as low a non-linear index of refraction as possible.

A widely used commercial silicate laser glass has the following composition:

| | Mole Parts |
|---|---|
| $SiO_2$ | 60.0 |
| $Al_2O_3$ | 2.5 |
| $Li_2O$ | 27.5 |
| $CaO$ | 10.0 |
| $Nd_2O_3$ | 0.5 (3.0 Wt. %) |
| $CeO_2$ | 0.16 |

Its refractive index, $n_D$, is 1.5672 and its Abbe number is 58.2. Its non-linear index of refraction according to the foregoing formula is $1.55 \times 10^{-13}$. In contrast the phosphate glass of Example 18 has a much lower refractive index and a higher Abbe number and has a non-linear index of refraction, $n_2$, of $1.04 \times 10^{-13}$.

The Examples hereinafter, including those of Table I, except Examples 3, 4, 7, 14, 22, 23, 24 and 25, are examples of glasses of the invention having the properties set forth for glasses of the present invention.

EXAMPLE I

A laser glass having the following composition

| | Weight Percent |
|---|---|
| $P_2O_5$ | 63.13 |
| $Al_2O_3$ | 3.78 |
| $K_2O$ | 18.63 |
| $BaO$ | 9.47 |
| $Nd_2O_3$ | 5.00 | was prepared from the following batch ingredients:

| | Parts by Weight |
|---|---|
| Alumina[1] | 190.275 |
| Monopotassium orthophosphate[2] | 2645.286 |
| Orthophosphoric acid[3] | 2456.685 |
| Barium hydrogen orthophosphate[4] | 735.088 |
| Neodymium oxide[5] | 251.017 |

[1]$Al_2O_3$ 99.3, $Fe_2O_3$ 0.0019, $Na_2O$ 0.0010, $K_2O$ 0.0005 and $Li_2O$ 0.0003 weight percent.
[2]$P_2O_5$ 52.7000, $K_2O$ 35.3400, and $Fe_2O_3$ 0.0009 weight percent, balance water.
[3]$P_2O_5$ 62.38, $Fe_2O_3$ 0.0004, balance water
[4]$BaO$ 64.4000, $P_2O_5$ 31.6000, $Fe_2O_3$ 0.0030 weight percent, balance water.
[5]$Nd_2O_3$ 99.6000, $Fe_2O_3$ 0.0001

The solid ingredients were blended and then mixed with stirring and gentle heating (to about 110° F) into the orthophosphoric acid to form a thick slurry. The walls of the mixing container were glass and a plastic stirrer was used.

This slurry was poured into a large number of Teflon lined molds about 3 inches in diameter by about 1 inch deep. On cooling the slurry solidified to form solid patties of the raw material batch.

In an electric furnace set at 2000° F was placed a silica container with an initial portion of the patties and then incremental portions about every 10 to 15 minutes over a total charging period of one hour and 45 minutes. Charging in small increments is necessitated by the violent evolution of water contained in the batch material. Heating was continued for about 15 more minutes to allow further evolution of water. Then preheated high density alumina tubes were lowered into the melt and dry air (dew point −64° C) was bubbled through the melt for about 16 hours, after which the melt was transferred to a platinum crucible and heated with bubbling of dry air in the same manner as before for a further period of about 6 hours at the same 2000° F temperature. The bubblers were then removed and the melt was cast into a variety of shapes, including slabs measuring about 9 inches × 4 inches × 1 inch and discs of about 2 inches diameter.

The glass showed none or few seeds or cord and no devitrification, was a highly transparent pale lavender and was annealed for an hour at 660° F.

A large number of melts of the composition of Example 2 were made using varying melting times and times of bubbling dry air through the melt in order to obtain glasses having varying amounts of water (or hydroxyl ion) as indicated by measurement of the transparency to light of a wavelength of 2.1 microns. Transparency is defined as the ratio of the intensity of the transmitted light to the incident light.

The transparency of each glass at 2.1 microns (normalized to 1 cm. thickness) and the fluorescence decay time for each glass was measured with the results shown in the following table. The transparency values are internal transparency, having been corrected for reflection losses:

| Transparency × 100 | Fluorescence Decay Time, Microseconds |
|---|---|
| 1.2 | 41 |
| 3.8 | 51 |
| 4.7 | 54 |
| 19.7 | 100 |
| 50 | 144 |
| 64 | 186 |
| 73 | 228 |
| 75 | 235 |
| 80 | 268 |
| 83 | 283 |
| 86 | 293 |
| 89 | 299 |

The glasses of the invention all have sufficiently low water content that their transparency at 2.1 microns is at least 0.65. Thus, it has been found that water in the glass laser quenches the fluorescence of the neodymium. My laser glass thus has an excellent decay time, particularly when the transparency at 2.1 microns is at least 0.80.

The following experiments further illustrate the process of the invention for making $Nd_2O_3$ activated phosphate glasses having low water content and consequent advantageous fluorescence decay time.

A glass of the composition of Example 2 in Table I was melted in a manner similar to Example 1 except that the melt was mechanically stirred and no bubbling or other provision for dry air was practiced. Instead, the melting was done entirely in contact with room air. During melting, samples of the glass were removed at intervals. The following table shows the total time of batch melting for each sample, the transparency at 2.2 mirons per cm. thickness, and the fluorescence decay time.

| Sample | Duration of Melting Hrs. | Min. | Transparency × 100 | Fluorescence Decay Time, Microseconds |
|---|---|---|---|---|
| 1 | 1 | — | 50.5 | 166 |
| 2 | 6 | 40 | 51.6 | 172 |
| 3 | 17 | 20 | 53.7 | 182 |
| 4 | 21 | 17 | 50.7 | 170 |

Similarly, the last experiment was repeated except that dry air (dew point, −64° C) was bubbled through the glass (without mechanical stirring) until the second sample had been taken and then no bubbling or purging air stream was thereafter used, but the melt was mechanically stirred and was in contact with the ambient air atmosphere. The results are shown below:

| Sample | Duration of Melting Hrs. | Mins. | Transparency × 100 | Fluorescence Decay Time, Microseconds |
|---|---|---|---|---|
| 1 | 1 | — | 53.6 | 176 |
| 2 | 17 | | 78.3 | 266 |
| 3 | 25 | 30 | 66.5 | 216 |
| 4 | 27 | 30 | 61.7 | 204 |

It will be seen from this data that the dry air began to quite effectively remove water from the glass, so that when the second sample was removed, the glass had a transparency of 0.783. Then on continued heating without dry air but in the presence of ordinary wet ambient air, the sample began to become wet again as indicated by the figures in the table above, thus demonstrating the importance of this feature of the invention.

A glass of the composition of Example 18 of Table 1 was melted with purging (not bubbling) of dry air above the surface of the melt, using mechanical stirring of the melt. After purging with air during melting for 20 hours, a sample was taken. The glass had a transparency relative to 2.2 microns of 0.807 and a fluorescence decay time of 291 microseconds.

In Table I are listed representative examples of laseable glasses of the invention, plus other phosphate glasses containing $Nd_2O_3$ which are outside the scope of my invention. These examples illustrate a wide range of compositions and study thereof will reveal some of the effects discussed hereinbefore.

Under "Chemical durability" as referred to in the table are recorded the observations with respect to glasses that had been stored for about one year in ambient air containing atmospheric moisture. Where results are not reported, the glasses either have not been made for as long as one year, or they have been disturbed since they were made such as by machining, and so cannot now be compared with the other glasses in this respect.

It will be noted that Examples 3, 4 and 22 contain no $Al_2O_3$ and are either unstable or are severely attacked by ambient moisture, while glass 24 which contains excessive BaO also devitrified on casting. Examples 23 and 25 contain too much $K_2O$ and were thus severely attacked by atmospheric moisture. Inspection of these two compositions reveals that $Al_2O_3$ better protects against moisture in the air than does BaO.

TABLE I

| Example: | 2 | | 3 | | 4 | | 5 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 60.0 | 64.75 | 50.0 | 54.06 | 60.0 | 63.51 | 50 | 55.13 |
| $Al_2O_3$ | 5.0 | 3.88 | — | — | — | — | 5 | 3.96 |
| $K_2O$ | 26.67 | 19.10 | 33.33 | 23.91 | 26.67 | 18.74 | 33.33 | 24.39 |

TABLE I-continued

| | | | | | | | | |
|---|---|---|---|---|---|---|---|---|
| BaO | 8.33 | 9.71 | 16.67 | 19.47 | 13.33 | 15.24 | 11.67 | 13.90 |
| $La_2O_3$ | — | — | — | — | — | — | — | — |
| $Nd_2O_3$ | 1.0 | 2.56 | 1.0 | 2.56 | 1.0 | 2.51 | 1.0 | 2.61 |
| Transparency* per cm. × 100 | | 78.3 | | | | | | |
| Fluorescence decay time, microseconds | | 266 | | | | 227 | | 233 |
| $n_D$ | | 1.509 | | | | 1.507 | | 1.513 |
| Chemical durability | Moderately severe attack | | | | Very severe attack Surface deeply etched | | No visible attack | |
| Density | | 2.6762 | | | | 2.7191 | | 2.7730 |
| Remarks | | | Devitrified | | | | | |

| Example: | 6 | | 7 | | 8 | | 9 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 46.4 | 52.07 | 50.0 | 53.10 | 60.0 | 62.87 | 50.0 | 56.26 |
| $Al_2O_3$ | 5.2 | 4.21 | 5.0 | 3.81 | 5.0 | 3.76 | 10.0 | 8.08 |
| $K_2O$ | 35.0 | 26.04 | 25.0 | 17.62 | 20.0 | 13.91 | 33.33 | 24.89 |
| BaO | 12.3 | 14.84 | 20.0 | 22.95 | 15.0 | 16.98 | 6.67 | 8.11 |
| $La_2O_3$ | — | — | — | — | — | — | — | — |
| $Nd_2O_3$ | 1.07 | 2.83 | 1.0 | 2.52 | 1.0 | 2.48 | 1.0 | 2.67 |
| Transparency per cm. × 100 | | | | | | | | |
| Fluorescence decay time, microseconds | | | | | | 224 | | 242 |
| $n_D$ | | 1.515 | | 1.529 | | 1.519 | | 1.509 |
| Chemical Durability | almost no attack | | | | almost no attack | | no attack | |
| Density | 2.8090 | | 2.9790 | | 2.8035 | | 2.7078 | |

| Example: | 10 | | 11 | | 12 | | 13 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 60.0 | 66.06 | 50.0 | 54.55 | 60.0 | 64.08 | 56.14 | 60.1 |
| $Al_2O_3$ | 10.0 | 7.91 | 10.0 | 7.84 | 10.0 | 7.67 | 9.81 | 7.56 |
| $K_2O$ | 26.67 | 19.48 | 26.67 | 19.31 | 20.0 | 14.18 | 21.98 | 15.64 |
| BaO | 3.33 | 3.96 | 13.33 | 15.71 | 10.0 | 11.54 | 12.07 | 14.09 |
| $La_2O_3$ | — | — | — | — | — | — | — | — |
| $Nd_2O_3$ | 1.0 | 2.61 | 1.0 | 2.59 | 1.0 | 2.53 | 1.02 | 2.60 |
| Transparency per cm. × 100 | | | | | | | | |
| Fluorescence decay time, microseconds | 263 | | 270 | | 270 | | 279 | |
| $n_D$ | 1.503 | | 1.525 | | 1.518 | | 1.525 | |
| Chemical Durability | Slight attack | | no attack | | no attack | | no attack | |
| Density | 2.5982 | | 2.8560 | | 2.7452 | | 2.8468 | |

| Example: | 14 | | 15 | | 16 | | 17 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 40.0 | 43.92 | 60.0 | 63.13 | 55.0 | 60.27 | 55.0 | 59.10 |
| $Al_2O_3$ | 10.0 | 7.89 | 5.0 | 3.78 | 10.0 | 7.87 | 5.0 | 3.86 |
| $K_2O$ | 30.0 | 21.86 | 26.67 | 18.62 | 26.67 | 19.40 | 26.67 | 19.02 |
| BaO | 20.0 | 23.72 | 8.33 | 9.47 | 8.33 | 9.86 | 13.33 | 15.47 |
| $La_2O_3$ | — | — | — | — | — | — | — | — |
| $Nd_2O_3$ | 1.0 | 2.60 | 2.005 | 5.0 | 1.0 | 2.60 | 1.0 | 2.55 |
| Transparency per cm. × 100 | | | 65 | | 81.7 | | 78.5 | |
| Fluorescence decay time, microseconds | | | 139 | | 280 | | 259 | |
| $n_D$ | 1.533 | | 1.513 | | 1.5151 | | 1.5164 | |
| Chemical Durability | | | | | | | | |
| Density, gms./cc. | 3.0086 | | 2.7180 | | 2.7329 | | 2.7883 | |
| Abbe Value | | | | | 67.2 | | 67.1 | |
| $n_2 \times 10^{13}$ | | | | | 1.07 | | 1.07 | |

| Example: | 18 | | 19 | | 20 | | 21 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 60.0 | 63.19 | 60.0 | 63.23 | 40.0 | 44.60 | 60.0 | 63.22 |
| $Al_2O_3$ | 5.0 | 3.78 | 5.0 | 3.79 | 10.0 | 8.01 | 5.0 | 3.78 |
| $K_2O$ | 26.67 | 18.64 | 26.67 | 18.65 | 33.33 | 24.66 | 26.67 | 18.65 |
| BaO | 8.33 | 9.48 | 8.33 | 9.48 | 16.67 | 20.08 | 8.33 | 9.48 |
| $La_2O_3$ | 1.0 | 2.42 | 1.84 | 4.45 | — | — | 1.60 | 3.87 |
| $Nd_2O_3$ | 1.0 | 2.50 | 0.16 | 0.40 | 1.0 | 2.64 | 0.40 | 1.00 |
| Transparency per cm. × 100 | | 80.7 | | 80.2 | | | | 74.5 |
| Fluorescence decay time, microseconds | | 284 | | 330 | | 283 | | 301 |
| $n_D$ | | 1.51242 | | 1.511 | | 1.525 | | 1.511 |
| Chemical Durability | | | | | no attack | | | |
| Density | | 2.7110 | | 2.7119 | | 2.9196 | | 2.7133 |
| Abbe Value | | 68.0 | | | | | | |
| $n_2 \times 10^{13}$ | | 1.04 | | | | | | |

TABLE I-continued

| Example: | 22 | | 23 | | 24 | | 25 | |
|---|---|---|---|---|---|---|---|---|
| Composition | Mole Parts | Weight Percent | Mole Parts | Weight Percent | Mole Parts | Weight Percent | Mole Parts | Weight Percent |
| $P_2O_5$ | 40.0 | 44.19 | 40.0 | 45.09 | 40.0 | 43.07 | 40.0 | 46.03 |
| $Al_2O_3$ | — | — | 5.0 | 4.05 | 5.0 | 3.87 | 10.0 | 8.27 |
| $K_2O$ | 40.0 | 29.33 | 40.0 | 29.92 | 30.0 | 21.44 | 40.0 | 30.55 |
| BaO | 20.0 | 23.87 | 15.0 | 18.27 | 25.0 | 29.08 | 10.0 | 12.43 |
| $La_2O_3$ | — | — | — | — | — | — | — | — |
| $Nd_2O_3$ | 1.0 | 2.62 | 1.0 | 2.67 | 1.0 | 2.55 | 1.0 | 2.73 |
| Transparency per cm. × 100 | | | | | | | | |
| Fluorescence decay time, microseconds | | | 284 | | | | 285 | |
| $n_D$ | | | 1.519 | | | | 1.513 | |
| Chemical Durability | — | | glass turned to powder | | — | | Severe attack Surface etched | |
| Density | | | 2.8832 | | | | 2.7816 | |
| Remarks | Devitrified | | | | Devitrified | | | |

*at 2.1 microns; sometimes measured at 2.2 microns

A laser rod was made from another melt of the same composition as Example 18. The rod was ¼ inch in diameter and 3 inches long; its ends were polished flat and parallel to a close tolerance. The rod was inserted in a silvered, polished laser cavity of elliptical cross section. External dielectric mirrors were used, having reflectivities of 100 percent and 83.5 percent, respectively.

The laser was operated using a xenon flashlamp, model FX38C-3 sold by EG&G Inc. of Boston, Massachusetts. The energy of the flashlamp was supplied from two 25 microfarad capacitors which were discharged through a 50 microhenry inductance. The capacitors were charged to the desired voltage with a variable voltage power supply. The voltage used in successive tests is shown in the table below. The test was repeated for a laser rod of the same size made of the commercial silicate laser glass of the composition set forth hereinbefore. The energy in each laser beam was measured with a thermopile. Results were as follows:

| Kilovolts | Silicate Glass Energy, Joules | | Phosphate Glass Energy, Joules | |
|---|---|---|---|---|
| | In | Out | In | Out |
| 1 | 25 | 0.36 | 25 | 0.5 |
| 1.4 | 49 | 0.89 | 49 | 1.13 |
| 1.7 | 72 | 1.25 | 72 | 1.54 |
| 2.0 | 100 | 1.58 | 100 | 1.91 |

It will be seen that the phosphate glass is considerably more efficient than the commercial silicate glass at each voltage tested.

In the following claims the term "a neodymium oxide phosphate laser glass component" means a laser component, such as a laser rod or disc of a phosphate glass having $Nd^{3+}$ as the active lasing species.

From the foregoing it will be evident that modifications of this invention can be made without departing from the spirit and scope of this disclosure or from the scope of the following claims.

What is claimed is:

1. A glass suitable for use as an active laser component and having a composition consisting essentially of

| | Mole Percent |
|---|---|
| $P_2O_5$ | 39 – 65 |
| $Al_2O_3$ | 4 – 13 |
| $K_2O$ | 19 – 36 |
| BaO | 3 – 18.5 |
| $La_2O_3$ | 0 – 3 | and a laseable amount of $Nd_2O_3$ up to 6 mole percent, wherein the total moles of $P_2O_5+Al_2O_3+La_2O_3+Nd_2O_3$ is at least 50 and the transparency of the glass to light of a wavelength of 2.1 microns is at least 0.65 per cm. of thickness.

2. A glass according to claim 1 wherein the mole percent of $Nd_2O_3$ is from 0.05 to 4 and the total mole percent of $Nd_2O_3+La_2O_3$ is from 0.05 to 4.

3. A laser component having a composition of the glass of claim 1.

4. A laser component having a composition of the glass of claim 2.

5. In the method for making a phosphate laser glass having $Nd_2O_3$ as the active lasing species and having at least 39 mole percent $P_2O_5$ which comprises melting the batch materials at elevated temperature in an atmosphere containing oxygen gas for a time sufficient to produce a homogeneous glass melt and thereafter cooling the melt to a solid glass, the improvement which comprises maintaining a dry atmosphere containing oxygen gas in contact with the melt during the final stages of melting for a time sufficient to produce a sufficiently dry glass such that the transparency thereof with respect to light of a wavelength of 2.1 microns is at least 0.65 per cm. of thickness.

6. The improvement according to claim 5 wherein said melting in contact with said dry atmosphere is effected for a time sufficient to produce a glass having a transparency with respect to light of a wavelength of 2.1 microns of at least 0.80 per cm. of thickness.

7. In a method of making a neodymium oxide phosphate laser glass component, the improvement which comprises (1) preparing a melt of a composition consisting essentially of

| | Mole Percent |
|---|---|
| $P_2O_5$ | 39 – 65 |
| $Al_2O_3$ | 4 – 13 |
| $K_2O$ | 19 – 36 |
| BaO | 3 – 18.5 |
| $La_2O_3$ | 0 – 3 | and a laseable amount of $Nd_2O_3$ up to 6 mole percent, wherein the total moles of $P_2O_5+Al_2O_3+La_2O_3+Nd$-

$_2O_3$ is at least 50, (2) contacting the melt with a dry atmosphere containing oxygen gas at elevated temperature during the latter stages of melting for a time effective to produce a sufficiently dry glass such that the transparency thereof with respect to light of a wave length of 2.1 microns is at least 0.65, per cm. of thickness and (3) preparing a glass laser component from said melt.

8. The improvement of claim 7 wherein the laser glass contains from 0.05 to 4 mole percent $Nd_2O_3$ and from 0.05 to 4 mole percent $Nd_2O_3$ plus $La_2O_3$.

9. The improvement of claim 7 wherein said contacting is effected for a time effective to produce a sufficiently dry glass such that the transparency thereof with respect to light of a wave length of 2.1 microns is at least 0.80 per cm. of thickness.

10. The improvement of claim 9 wherein the laser glass contains from 0.05 to 4 mole percent $Nd_2O_3$ and from 0.05 to 4 mole percent $Nd_2O_3 + La_2O_3$.

11. A glass suitable for use as an active laser component and having a composition consisting essentially of

|  | Mole Percent |
|---|---|
| $P_2O_5$ | 39 – 65 |
| $Al_2O_3$ | 4 – 13 |
| $K_2O$ | 19 – 36 |
| BaO | 3 – 18.5 |
| $La_2O_3$ | 0 – 3 | and a laseable amount of $Nd_2O_3$ up to 6 mole percent, wherein the total moles of $P_2O_5 + Al_2O_3 + La_2O_3 + Nd_2O_3$ is at least 50 and the transparency of the glass to light of a wavelength of 2.1 microns is at least 0.65 per cm. of thickness, made by a method according to the improvement of claim 5.

* * * * *